(12) United States Patent
Amemiya

(10) Patent No.: US 8,934,272 B2
(45) Date of Patent: Jan. 13, 2015

(54) ULTRASONIC IMAGE DISPLAY APPARATUS POWER CIRCUIT AND ULTRASONIC IMAGE DISPLAY APPARATUS

(75) Inventor: Shinichi Amemiya, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 329 days.

(21) Appl. No.: 13/365,025

(22) Filed: Feb. 2, 2012

(65) Prior Publication Data

US 2012/0200196 A1 Aug. 9, 2012

(30) Foreign Application Priority Data

Feb. 4, 2011 (JP) ................. 2011-023266

(51) Int. Cl.
 *H02M 3/18* (2006.01)
 *G01S 7/52* (2006.01)
 *B06B 1/02* (2006.01)
(52) U.S. Cl.
 CPC ......... *G01S 7/52019* (2013.01); *B06B 2201/76* (2013.01); *B06B 1/0207* (2013.01)
 USPC .......................................................... 363/59
(58) Field of Classification Search
 CPC .............................. H02M 1/10; B06B 1/0207
 USPC ........ 363/59, 60; 310/218, 219; 600/437, 440
 See application file for complete search history.

(56) References Cited

U.S. PATENT DOCUMENTS

| 5,777,860 | A  | * | 7/1998  | Halbert | ............................ | 363/34  |
| 6,752,761 | B2 | * | 6/2004  | Amemiya | ...................... | 600/437 |
| 7,132,810 | B2 | * | 11/2006 | Murakami | .................... | 318/376 |
| 7,408,290 | B2 |   | 8/2008  | May et al. | | |
| 7,777,394 | B2 |   | 8/2010  | Amemiya | | |
| 7,855,609 | B2 |   | 12/2010 | Amemiya | | |
| 2010/0019833 | A1 | | 1/2010  | Zang et al. | | |
| 2010/0295487 | A1 | | 11/2010 | Li et al. | | |
| 2010/0331703 | A1 | | 12/2010 | Amemiya | | |

FOREIGN PATENT DOCUMENTS

| CN | 1518958 A    | 8/2004 |
| JP | 2005052364 A | 3/2005 |
| JP | 2010029657   | 2/2010 |

* cited by examiner

*Primary Examiner* — Matthew Nguyen

(74) *Attorney, Agent, or Firm* — Armstrong Teasdale LLP

(57) ABSTRACT

An ultrasonic image display apparatus power circuit is provided. The power circuit includes a high-voltage fixed power supply portion configured to boost a voltage of a low-voltage power supply and generate positive and negative voltages, a bias voltage output portion connected to the high-voltage fixed power supply portion and configured to output a bias voltage to a switch configured to switch an ultrasonic transducer configured to transmit and receive an ultrasonic wave, a transmission power supply portion connected to the high-voltage fixed power supply portion, the transmission power supply portion configured to supply transmission power for the ultrasonic wave to the ultrasonic transducer and configured to regenerate the transmission power as regeneration power to the high-voltage fixed power supply portion, and a regenerative electric power storage portion provided between the high-voltage fixed power supply portion and the transmission power supply portion and configured to store regeneration power.

20 Claims, 9 Drawing Sheets

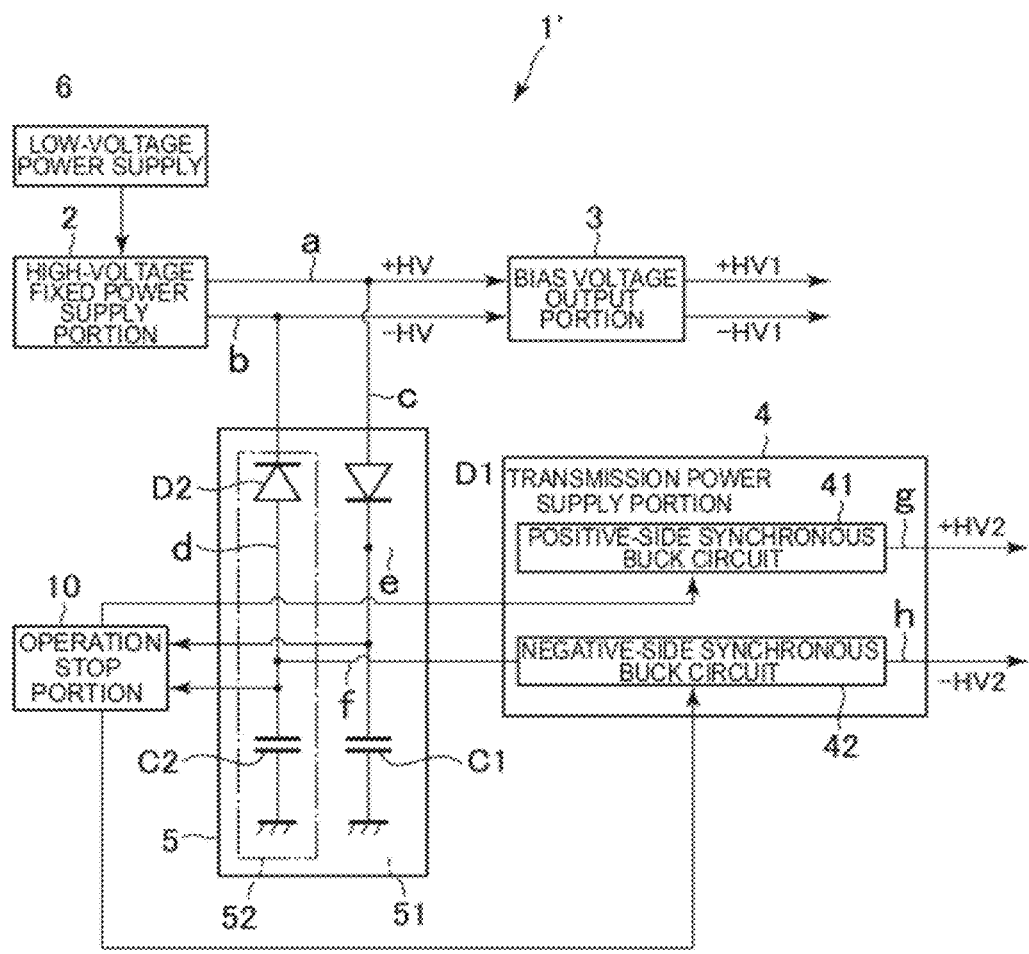

ULTRASONIC IMAGE DISPLAY APPARATUS POWER CIRCUIT AND ULTRASONIC IMAGE DISPLAY APPARATUS

CROSS REFERENCE TO RELATED APPLICATIONS

This application claims the benefit of Japanese Patent Application No. 2011-023266 filed Feb. 4, 2011, which is hereby incorporated by reference in its entirety.

BACKGROUND OF THE INVENTION

The embodiments described herein relate to an ultrasonic image display apparatus power circuit and an ultrasonic image display apparatus.

An ultrasonic image display apparatus displays an ultrasonic image based on an echo signal acquired by transmitting an ultrasonic wave. To transmit an ultrasonic wave, the ultrasonic image display apparatus applies a voltage to an ultrasonic transducer made of a piezoelectric material and oscillates the ultrasonic transducer. Accordingly, the ultrasonic image display apparatus is provided with a power circuit that supplies transmission power for the ultrasonic wave. For example, see Japanese Patent Application Laid Open No. 2010-029657.

The ultrasonic image display apparatus transmits an ultrasonic wave using some of ultrasonic transducers provided for an ultrasonic probe. An analog switch is provided for selecting an ultrasonic transducer used for the ultrasonic wave transmission. Accordingly, the ultrasonic image display apparatus is also provided with a power circuit that supplies a bias voltage for the analog switch.

Conventionally, in many cases, the power circuit for ultrasonic transmission power is provided independently of the power circuit for bias power. This bottlenecks circuit miniaturization.

For example, a flyback converter is often used as the power circuit for ultrasonic diagnostic equipment. However, the power circuit using the flyback converter uneconomically consumes power due to a resistance load when a high voltage changes to a low voltage. The power circuit using the flyback converter may require a circuit for consuming power when a high voltage changes to a low voltage. This bottlenecks circuit miniaturization. As a limitation, the flyback converter can use only low frequencies.

SUMMARY OF THE INVENTION

In one aspect, an ultrasonic image display apparatus power circuit is provided. The power circuit includes a high-voltage fixed power supply portion that boosts a voltage of a low-voltage power supply and generates positive and negative voltages, a bias voltage output portion that is connected to the high-voltage fixed power supply portion and outputs a bias voltage to a switch for switching an ultrasonic transducer for transmitting and receiving an ultrasonic wave, a transmission power supply portion that is connected to the high-voltage fixed power supply portion, supplies transmission power for an ultrasonic wave to the ultrasonic transducer, and is capable of regenerating the transmission power as regeneration power to the high-voltage fixed power supply portion, and a regenerative electric power storage portion that is provided between the high-voltage fixed power supply portion and the transmission power supply portion and stores regeneration power from the transmission power supply portion.

In one embodiment, the transmission power supply portion is a synchronous buck circuit.

In one embodiment, the ultrasonic image display apparatus power circuit includes an operation stop portion that detects a voltage of the regenerative electric power storage portion and, when a detected voltage reaches a predetermined value or larger, stops an operation of the transmission power supply portion.

In one embodiment, the high-voltage fixed power supply portion connects with the bias voltage output portion and the transmission power supply portion. The bias voltage output portion and the transmission power supply portion do not use respective power supplies. The circuit can be miniaturized. The regenerative electric power storage portion stores regeneration power from the transmission power supply portion, making it possible to prevent the power from being consumed uneconomically. Regenerating the power can quickly change a high voltage to a low voltage.

The transmission power supply portion using a synchronous buck circuit instead of a flyback converter can increase available frequencies and promote miniaturization.

In one embodiment, an operation stop portion detects a voltage of the regenerative electric power storage portion and, when a detected voltage reaches a predetermined value or larger, stops an operation of the transmission power supply portion. The circuit can prevent voltage breakdown.

BRIEF DESCRIPTION OF THE DRAWINGS

FIG. 9 is a block diagram showing a power circuit according to a second embodiment.

DETAILED DESCRIPTION OF THE INVENTION

Exemplary embodiments will be described in further detail with reference to the accompanying drawings.

First Embodiment

Figure 1:
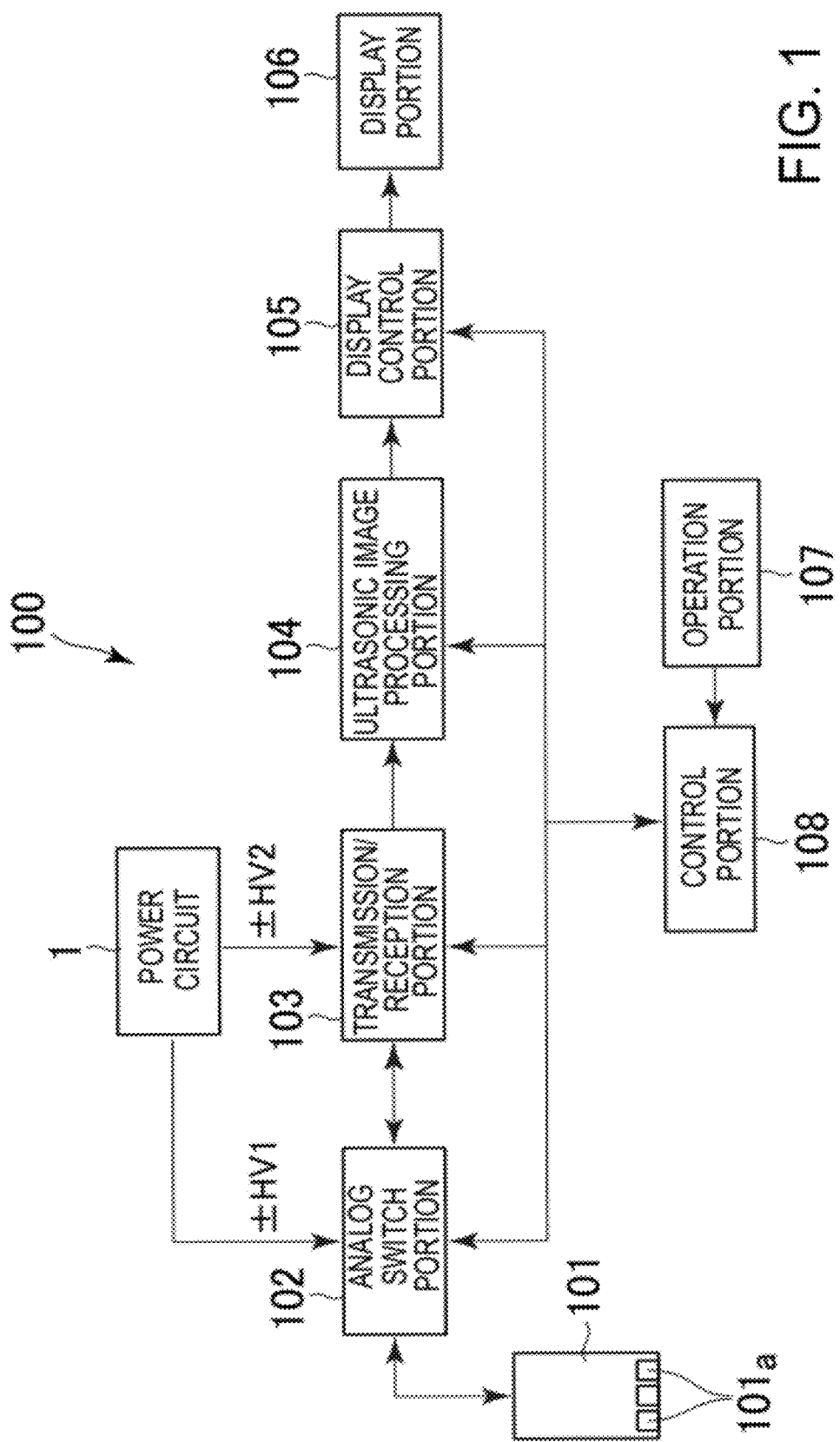
FIG. 1 is a block diagram exemplary ultrasonic image display apparatus.
Figure 2:
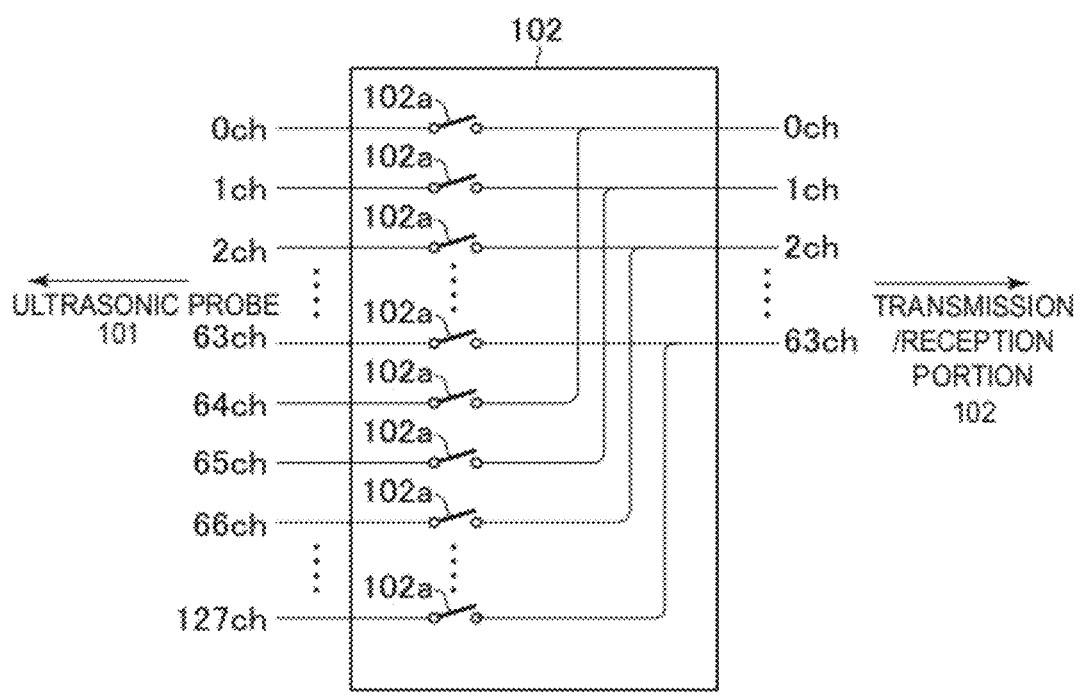
FIG. 2 shows a schematic configuration of an analog switch portion in the ultrasonic image display apparatus shown in FIG. 1.

The first embodiment will be described with reference to FIGS. 1 through 7. As shown in FIG. 1, an ultrasonic image display apparatus 100 includes an ultrasonic probe 101, an analog switch portion 102, a transmission/reception portion 103, an ultrasonic image processing portion 104, a display control portion 105, a display portion 106, an operation portion 107, and a control portion 108. The ultrasonic image display apparatus 100 also includes a power circuit 1. The power circuit 1 is an exemplary ultrasonic image display apparatus power circuit.

The ultrasonic probe 101 is provided with multiple ultrasonic transducers 101a for transmitting and receiving ultrasonic waves. The analog switch portion 102 selects the ultrasonic transducer 101a for transmitting and receiving ultrasonic waves.

The analog switch portion 102 selects the ultrasonic transducer 101a for transmitting and receiving ultrasonic waves by switching between the ultrasonic transducers 101a to be connected to the transmission/reception portion 103. The configuration of the analog switch portion 102 will be described with reference to FIG. 2. The analog switch portion 102 includes multiple analog switches 102a. The analog switch 102a is equivalent to a high voltage switch. For example, there are 128 analog switches 102a when the transmission/reception portion 103 includes 64 channels (0ch to 63ch) and the ultrasonic probe 101 includes 128 ultrasonic transducers 101a (0ch to 127ch). Turning on the analog switch 102a connects the ultrasonic transducer 101a to the transmission/reception portion 103 and selects the ultrasonic transducer 101 for transmitting and receiving ultrasonic waves.

The power circuit 1 supplies the analog switch 102a with bias voltages ±HV1. The analog switches 102a are switched based on the bias voltages ±HV1. The analog switch 102a is equivalent to a high voltage switch. The bias voltages ±HV1 range from ±50 V to ±100 V, for example.

Figure 3:
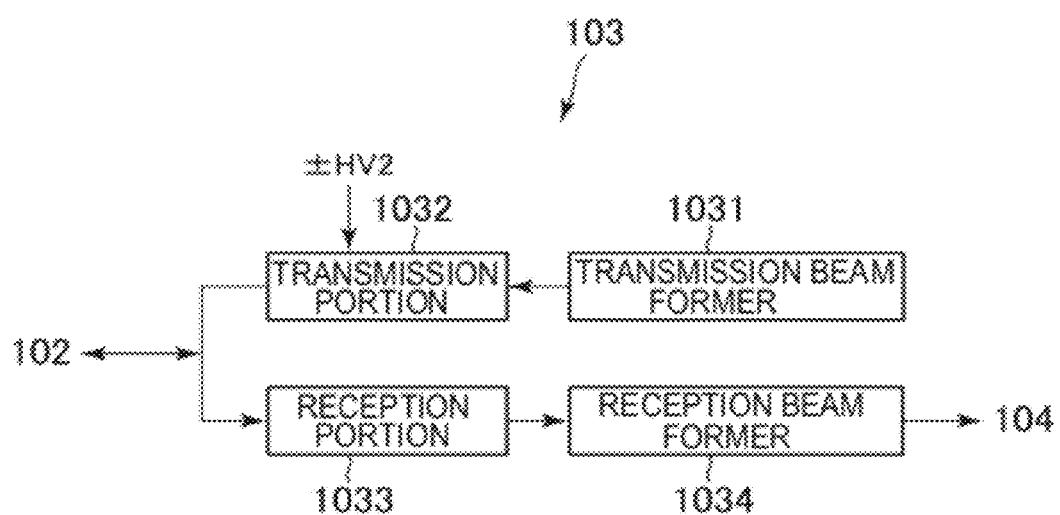
FIG. 3 is a block diagram showing a transmission/reception portion in the ultrasonic image display apparatus shown in FIG. 1.

As shown in FIG. 3, the transmission/reception portion 103 includes a transmission beam former 1031, a transmission portion 1032, a reception portion 1033, and a reception beam former 1034. Based on a control signal from the control portion 108, the transmission beam former 1031 outputs a signal to the transmission portion 1032 so as to generate a specified transmission beam. Based on the signal from the transmission beam former 1031, the transmission portion 1032 outputs a signal for driving the ultrasonic transducer 101a to the ultrasonic transducer 101a via the analog switch portion 102. The transmission portion 1032 is supplied with transmission voltages ±HV2 from the power circuit 1.

The reception portion 1033 initially amplifies an echo signal received by the ultrasonic transducer 101a. The reception beam former 1034 performs phasing and addition on an echo signal supplied from the reception portion 1033 and forms an echo signal for each sound ray.

The ultrasonic image processing portion 104 performs processes for generating an ultrasonic image on the echo signal supplied from the transmission/reception portion 103. For example, the ultrasonic image processing portion 104 performs a B-mode process including a logarithmic compression process and an envelope detection process, a quadrature detection process, and a color doppler process including a filter process.

The display control portion 105 allows a scan converter to perform scan conversion on the signal processed by the ultrasonic image processing portion 104 and generates ultrasonic image data. The display control portion 105 allows the display portion 106 to display an ultrasonic image based on the ultrasonic image data.

The display portion 106 includes an LCD (Liquid Crystal Display), a CRT (Cathode Ray Tube) or any other type of display. The operation portion 107 further includes a keyboard and a pointing device (not shown) for an operator to enter instructions or information.

The control portion 108 includes a CPU (Central Processing Unit). The control portion 108 reads a control program stored in a storage portion (not shown) and implements functions of the components in the ultrasonic image display apparatus 100.

Figure 4:
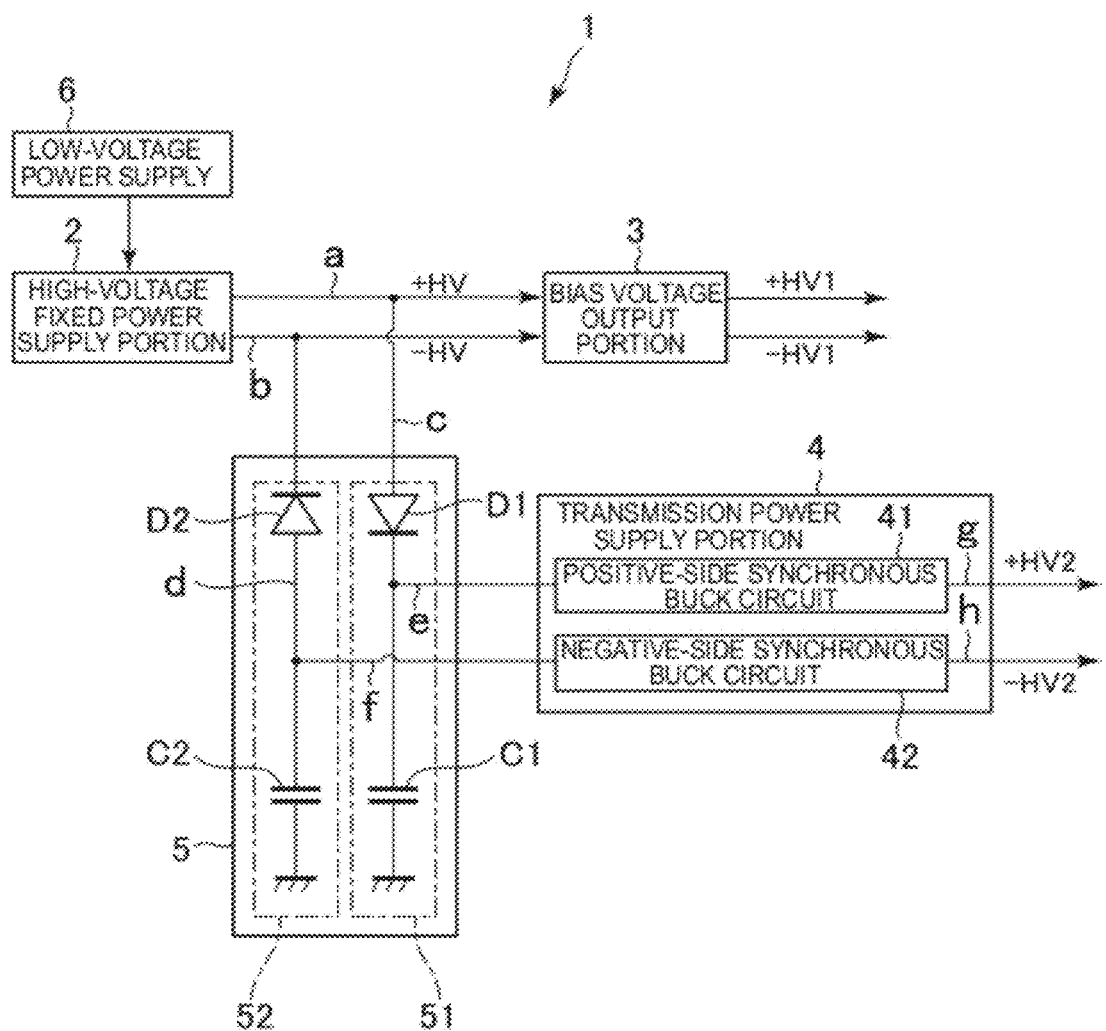
FIG. 4 is a block diagram showing a power circuit in the ultrasonic image display apparatus shown in FIG. 1.

The power circuit 1 will be described with reference to FIGS. 4 through 8. As shown in FIG. 4, the power circuit 1 includes a high-voltage fixed power supply portion 2, a bias voltage output portion 3, a transmission power supply portion 4, and a regenerative electric power storage portion 5.

The high-voltage fixed power supply portion 2 boosts a voltage supplied from a low-voltage power supply 6 to generate positive and negative voltages ±HV. For example, the low-voltage power supply 6 supplies a voltage of 10 V through 50 V. The voltages ±HV equal the bias voltages ±HV1 (±HV=±HV1) and range from ±50 V to ±100 V, for example. The high-voltage fixed power supply portion 2 is an exemplary high-voltage fixed power supply portion. The low-voltage power supply 6 is an exemplary low-voltage power supply.

The bias voltage output portion 3 is connected to output lines a and b of the high-voltage fixed power supply portion 2. The output line a is connected to a line c that is grounded. The output line b is connected to a line d that is grounded. The line c is provided with a diode D1 and a capacitor C1 in order from the side of the output line a. The line d is provided with a diode D2 and a capacitor C2 in order from the side of the output line b. The diodes D1 and D2 and the capacitors C1 and C2 configure the regenerative electric power storage portion 5.

The line c is connected to an input line e between the diode D1 and the capacitor C1. The line d is connected to an input line f between the diode D2 and the capacitor C2. The input line e is connected to a positive-side synchronous buck circuit 41 in the transmission power supply portion 4. The input line f is connected to a negative-side synchronous buck circuit 42 in the transmission power supply portion 4. An output line g is connected to the positive-side synchronous buck circuit 41. An output line h is connected to the negative-side synchronous buck circuit 42.

Figure 5:
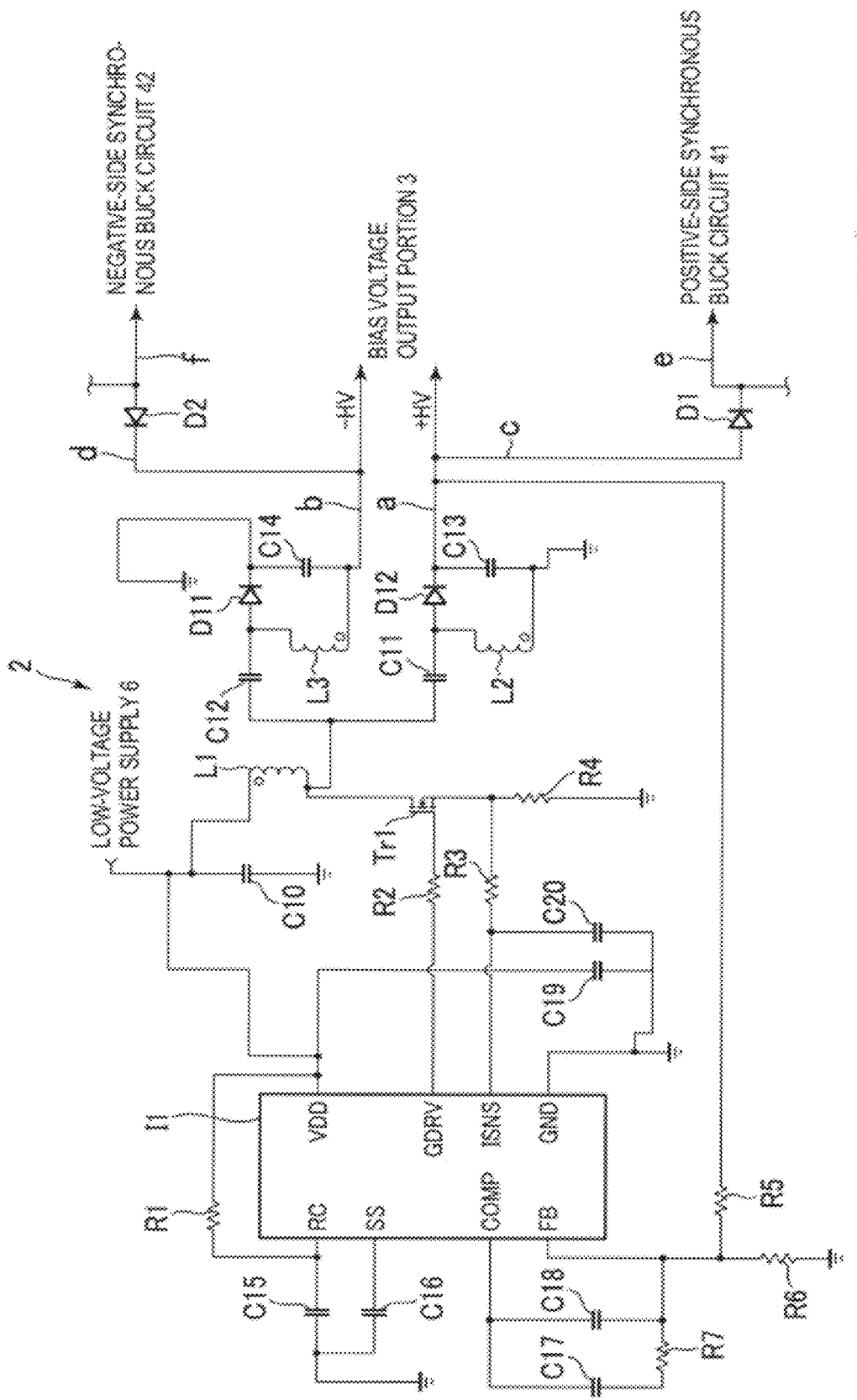
FIG. 5 is a circuit diagram showing a high-voltage fixed power supply portion in the power circuit shown in FIG. 4.

The high-voltage fixed power supply portion 2 will be described in detail with reference to FIG. 5. The high-voltage fixed power supply portion 2 is configured as an SEPIC (Single Ended Primary Converter) circuit. Specifically, the high-voltage fixed power supply portion 2 includes a transistor Tr1, diodes D11 and D12, inductors L1 through L3, capacitors C10 through C20, resistors R1 through R7, and a PWM (Pulse Width Modulation) controller I1.

In the high-voltage fixed power supply portion 2, the PWM controller I1 controls a switching operation of the transistor Tr1. As a result, a voltage supplied from the low-voltage power supply 6 is boosted to supply the output lines a and b with the voltages ±HV as specified. In more detail, the high-voltage fixed power supply portion 2 feeds the voltage +HV on the output line a back to the PWM controller I1. Based on the feedback voltage +HV, the PWM controller I1 controls the switching operation of the transistor Tr1 by outputting a signal to the transistor Tr1 so that the output lines a and b generate the specified voltages ±HV.

The bias voltage output portion 3 is connected to the high-voltage fixed power supply portion 2 via the output lines a and b and outputs the bias voltages ±HV1 to the analog switch portion 102. The bias voltage output portion 3 is an exemplary bias voltage output portion.

The bias voltage output portion 3 includes a low pass filter. The low pass filter removes a switching noise occurring on the high-voltage fixed power supply portion 2.

The bias voltage output portion 3 may be available as a current limiting circuit including a recoverable fuse.

The transmission power supply portion 4 is connected to the high-voltage fixed power supply portion 2 via the output lines a and b, the lines c and d and the input lines e and f. The transmission power supply portion 4 generates the transmission power (the transmission voltages ±HV2) for an ultrasonic wave based on the power (the voltages ±HV) supplied from the high-voltage fixed power supply portion 2. The transmission power supply portion 4 is an exemplary transmission power supply portion.

The transmission power supply portion 4 is capable of supplying the power to the input lines e and f (to the high-voltage fixed power supply portion 2) and to the output lines g and h (to the ultrasonic transducer 101a) as two opposite directions.

Specifically, the transmission power supply portion 4 is provided as a synchronous buck circuit according to the example and includes the positive-side synchronous buck circuit 41 and the negative-side synchronous buck circuit 42. The positive-side synchronous buck circuit 41 and the negative-side synchronous buck circuit 42 can regenerate the generated transmission power as regeneration power to the input lines e and f. As will be described, the regeneration power is stored in the regenerative electric power storage portion 5.

Figure 6:
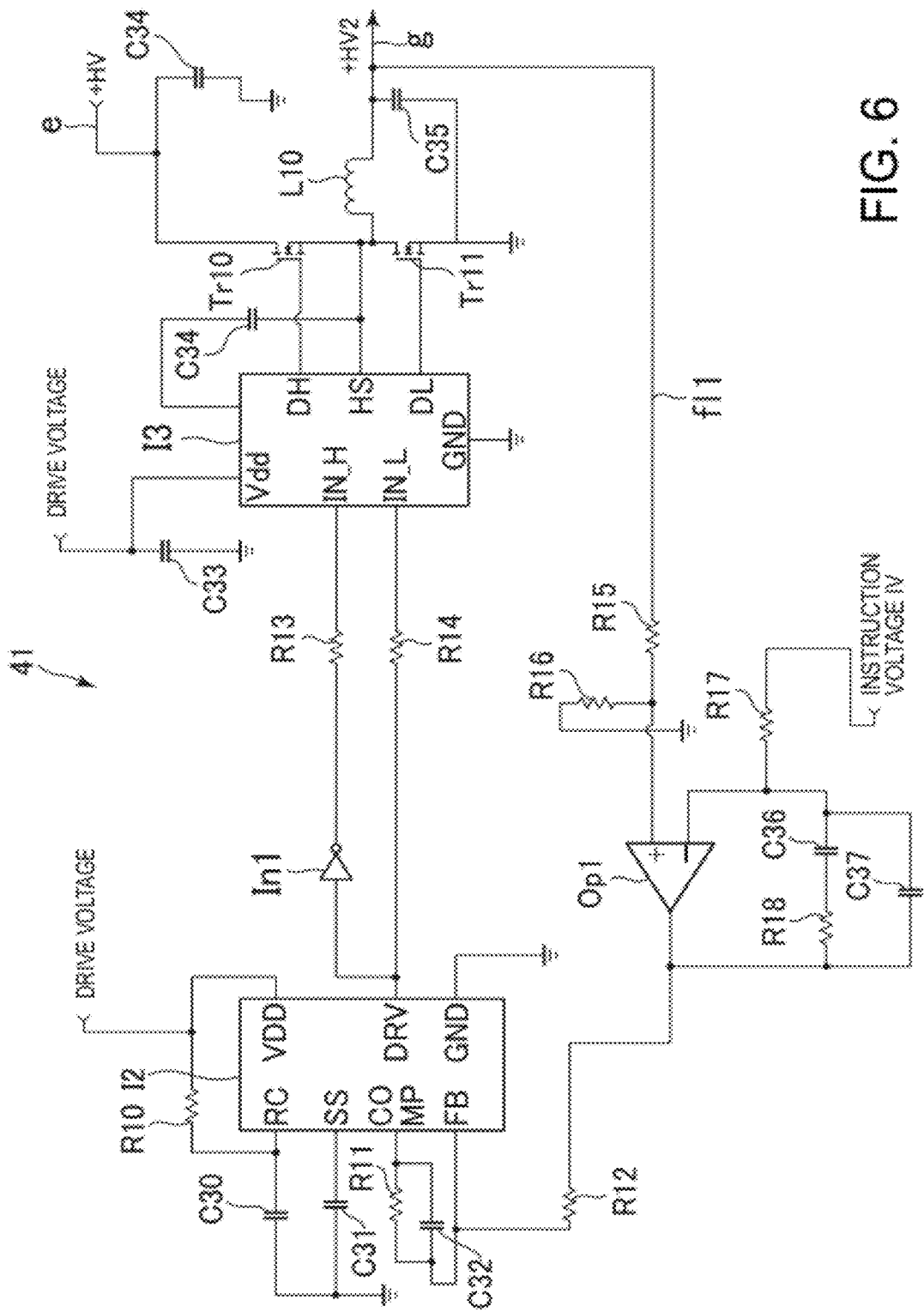
FIG. 6 is a circuit diagram showing a positive-side synchronous buck circuit in the power circuit shown in FIG. 4.

The positive-side synchronous buck circuit 41 will be described with reference to FIG. 6. The positive-side synchronous buck circuit 41 includes transistors Tr10 and Tr11, an inductor L10, capacitors C30 through C37, resistors R10 through R18, a PWM controller I2, a half bridge MOS FET driver I3, an operational amplifier Op1, and an inverter In1.

In the positive-side synchronous buck circuit 41, the half bridge MOS FET driver I3 controls switching operations of the transistor Tr10 and Tr11. Accordingly, the voltage +HV supplied from the input line e is set to a specified voltage and is output to the output line g. Specifically, the transmission voltage +HV2 from the output line g is fed back to the input side of the PWM controller I2 in the positive-side synchronous buck circuit 41. In more detail, the transmission voltage +HV2 from the output line g is input to a non-inverting input (+) of the operational amplifier Op1 provided on a feedback line f11 that connects the output line g with the PWM controller I2. An instruction voltage IV is input to an inverting input (−) of the operational amplifier Op1. The instruction voltage IV indicates a positive value (e.g., +3 V to +95 V) configured as the transmission voltage +HV2. The operational amplifier Op1 outputs a result of comparison between the transmission voltage +HV2 from the output line g and the instruction voltage IV. The comparison result is input to the PWM controller I2.

The PWM controller I2 outputs a signal to the half bridge MOS FET driver I3 based on the comparison result. The half bridge MOS FET driver I3 controls switching operations (on/off) of the transistors Tr10 and Tr11 based on the signal input from the PWM controller I2. The transistors Tr10 and Tr11 turn on and off alternately.

The PWM controller I2 outputs signals to the half bridge MOS FET driver I3 so that the switching operations of the transistors Tr10 and Tr11 set the transmission voltage +HV2 on the output line g to the instruction voltage IV.

The PWM controller I2 inputs two signals to the half bridge MOS FET driver I3. One of the signals passes through the inverter In1 and is input to the half bridge MOS FET driver I3.

The half bridge MOS FET driver I3 outputs signals to the transistors Tr10 and Tr11 so that the transistors Tr10 and Tr11 satisfy a specified duty ratio. The specified duty ratio is configured so that the transmission voltage +HV2 on the output line g is set to the instruction voltage IV. Accordingly, the output line g is supplied with the instruction voltage IV as the transmission voltage +HV2.

Figure 7:
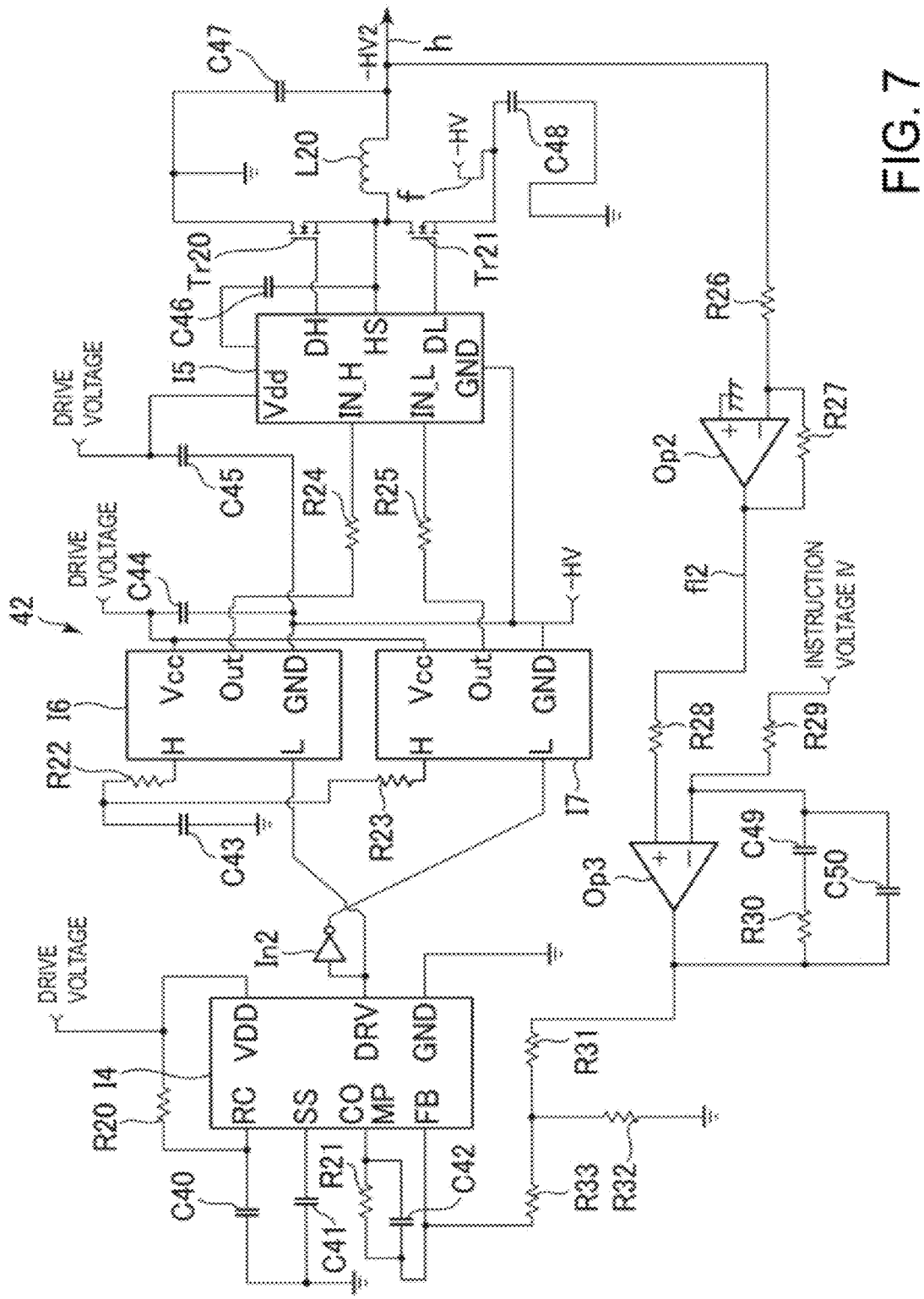
FIG. 7 is a circuit diagram showing a negative-side synchronous buck circuit in the power circuit shown in FIG. 4.

The negative-side synchronous buck circuit 42 will be described with reference to FIG. 7. The negative-side synchronous buck circuit 42 includes transistors Tr20 and Tr21, an inductor L20, capacitors C40 through C50, resistors R20 through R33, a PWM controller I4, a half bridge MOS FET driver I5, photocouplers I6 and I7, operational amplifiers Op2 and Op3, and an inverter In2.

In the negative-side synchronous buck circuit 42 like the positive-side synchronous buck circuit 41, the half bridge MOS FET driver I5 controls switching operations of the transistors Tr20 and Tr21. Accordingly, the voltage −HV supplied from the input line f is set to a specified voltage and is output to the output line h. Specifically, the transmission voltage −HV2 from the output line h is fed back to the input side of the PWM controller I4 in the negative-side synchronous buck circuit 42. In more detail, the transmission voltage −HV2 from the output line h is input to the operational amplifier Op2 that inverts the transmission voltage −HV2 to the positive. The inverted transmission voltage is then input to a non-inverting input (+) of the operational amplifier Op3. The operational amplifiers Op2 and Op3 are provided on a feedback line f12 that connects the output line h with the PWM controller I4. The instruction voltage IV is input to an inverting input (−) of the operational amplifier Op3. The operational amplifier Op3 outputs a result of comparison between the voltage (+HV), that is, the inverted version of the transmission voltage −HV2 from the output line h, and the instruction voltage IV. The comparison result is input to the PWM controller I4.

The PWM controller I4 outputs a signal to the photocouplers I6 and I7 based on the comparison result. The photocouplers I6 and I7 output signals to the half bridge MOS FET driver I5 based on the signal input from the PWM controller I4. The half bridge MOS FET driver I5 controls switching operations (on/off) of the transistors Tr20 and Tr21 based on the signals input from the photocouplers I6 and I7. The transistors Tr20 and Tr21 turn on and off alternately.

The photocouplers I6 and I7 use a drive voltage of (−HV+5) V, for example. The half bridge MOS FET driver I5 uses a drive voltage of (−HV+10) V.

The PWM controller I4 outputs a signal to the photocouplers I6 and I7 so that the switching operation of the transistors Tr20 and Tr21 sets the transmission voltage −HV2 on the output line h to the voltage −IV having the inverted sign of the instruction voltage IV. The voltage −IV is set to a value (e.g., −3 V through −95 V) configured as the transmission voltage −HV.

The PWM controller I4 outputs two signals. One signal is input to the photocoupler I6. The other signal passes through the inverter In2 and then is input to the photocoupler I7.

Two signals output from the PWM controller I4 range from 0 V to +5 V, for example. The photocouplers I6 and I7 shift the level of the signals input from the PWM controller I4 to the negative voltage side. The signals shifted to the negative side by the photocouplers I6 and I7 are input to the half bridge MOS FET driver I5.

The half bridge MOS FET driver I5 outputs signals to the transistors Tr20 and Tr21 so that the transistors Tr20 and Tr21 satisfy a specified duty ratio. The specified duty ratio is configured so that the transmission voltage −HV2 on the output line h is set to the voltage −IV. Accordingly, the output line h is supplied with the voltage −IV as the transmission voltage −HV2.

As shown in FIG. 4, the regenerative electric power storage portion 5 is provided between the high-voltage fixed power supply portion 2 and the transmission power supply portion 4 and stores the transmission power regenerated from the transmission power supply portion 4. The regenerative electric power storage portion 5 is an exemplary regenerative electric power storage portion.

The regenerative electric power storage portion 5 includes a positive-side regenerative electric power storage portion 51 and a negative-side regenerative electric power storage portion 52. The positive-side regenerative electric power storage portion 51 includes the diode D1 and the capacitor C1 serially connected to the line c. The negative-side regenerative electric power storage portion 52 includes the diode D2 and the capacitor C2 serially connected to the line d.

On the line c, the diode D1 is provided toward the high-voltage fixed power supply portion 2. The capacitor C1 is provided toward the ground. The positive-side synchronous buck circuit 41 is connected between the diode D1 and the capacitor C1. The capacitor C1 charges the regeneration power regenerated from the positive-side synchronous buck circuit 41.

On the line d, the diode D2 is provided toward the high-voltage fixed power supply portion 2. The capacitor C2 is provided toward the ground. The negative-side synchronous buck circuit 42 is connected between the diode D2 and the capacitor C2. The capacitor C2 charges the regeneration power regenerated from the negative-side synchronous buck circuit 42.

The diodes D1 and D2 are oriented so as to prevent a current from reversely flowing to the high-voltage fixed power supply portion 2 when the transmission power supply portion 4 charges the capacitors C1 and C2.

Effects of the power circuit 1 will be described. The high-voltage fixed power supply portion 2 generates the voltages ±HV based on a voltage supplied from the low-voltage power supply 6. Based on the voltages ±HV, the bias voltage output portion 3 outputs the bias voltages ±HV1 to the analog switch portion 102. The transmission power supply portion 4 generates the transmission voltages ±HV2 based on the ±HV and outputs ±HV2 to the transmission portion 1032.

The power circuit 1 may decrease the value of the transmission voltages ±HV2 when an ultrasonic wave transmission condition varies. In such a case, the regenerative electric power storage portion 5 stores the transmission power generated by the transmission power supply portion 4 as the regeneration power. The details will be described with reference to FIG. 8.

Figure 8:
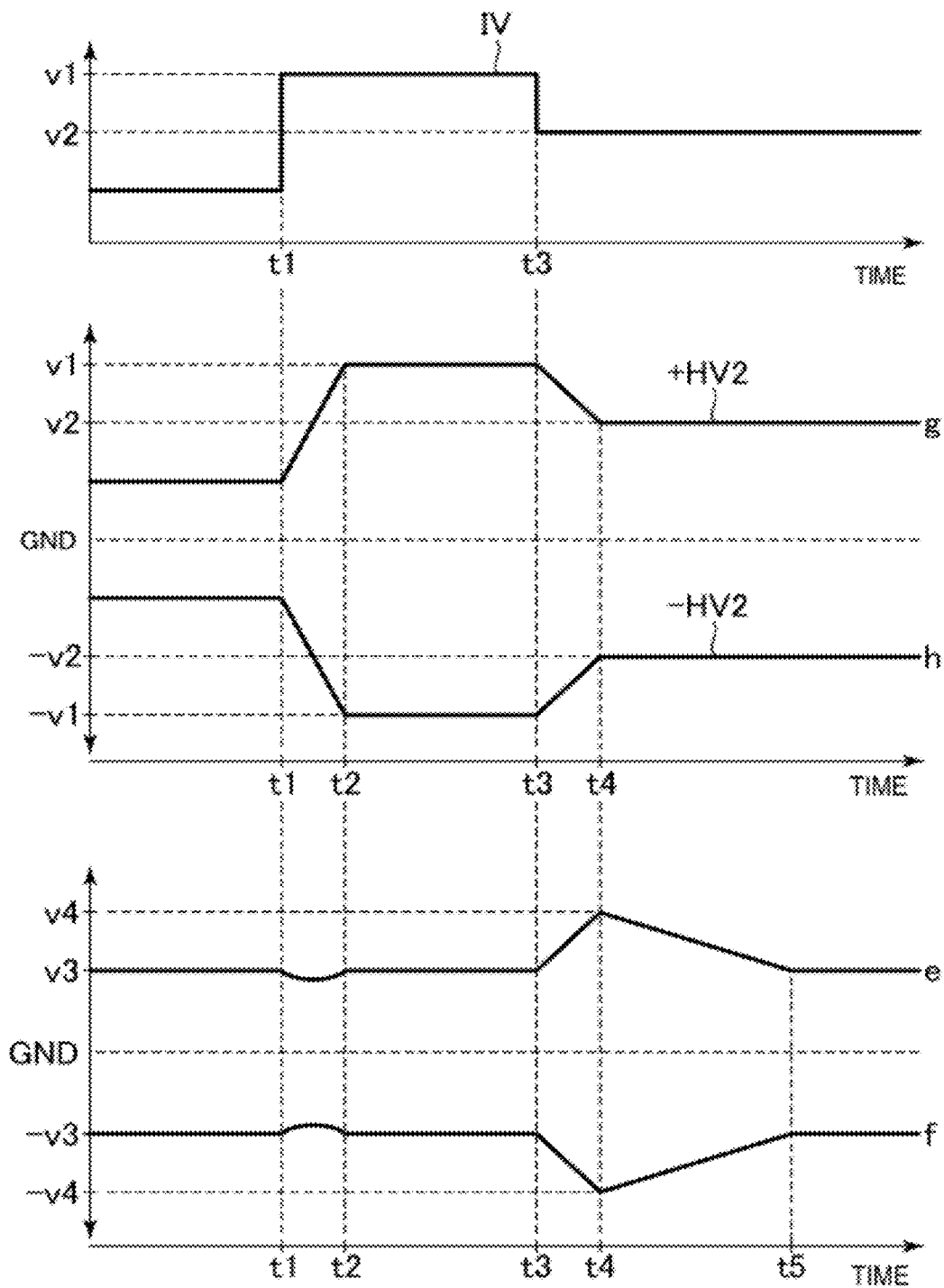
FIG. 8 shows temporal changes in an instruction voltage in the transmission power supply portion and voltages on an input line and an output line for the positive-side synchronous buck circuit and the negative-side synchronous buck circuit.

As shown in FIG. 8, the instruction voltage IV reaches v1 at time t1. The transmission voltages ±HV2 on the output lines g and h gradually approach ±v1 and reach ±v1 at time t2 with a specified lapse of time from time t1.

The instruction voltage IV reaches v2 at time t3 with a specified lapse of time from time t2. The transmission voltages ±HV2 on the output lines g and h gradually approach ±v2 and reach ±v2 at time t4 with a specified lapse of time from time t3. The condition of |v1|>|v2| is assumed.

Supposing that the diodes D1 and D2 are ideally conditioned, voltages on the lines e and f are ±v3 equal to voltages ±HV of the high-voltage fixed power supply portion 2 until time t3 (except time t1 to t2).

The positive-side synchronous buck circuit 41 and the negative-side synchronous buck circuit 42 supply power to the capacitors C1 and C2 and charge them (regeneration power charging) between time t3 and time t4 during which the instruction voltage IV changes from ±v1 to ±v2. Consequently, voltages on the input lines e and f change from ±v3 to ±v4 (|v3|<|v4|) and reach ±v4 at time t4.

The capacitors C1 and C2 start discharging when the voltages (transmission voltages ±HV2) on the output lines g and h reach ±v2 at time t4. The discharge continues until time t5. The voltages on the input lines e and f approach ±v3 from ±v4 and reach ±v3 at time t5 when the discharge ends.

As has been described, the power circuit 1 according to the example uses a synchronous buck circuit instead of a flyback converter for the transmission power supply portion 4 and therefore can increase available frequencies.

The high-voltage fixed power supply portion 2 connects with the bias voltage output portion 3 and the transmission power supply portion 4. The bias voltage output portion 3 and the transmission power supply portion 4 do not use respective power supplies. The circuit can be miniaturized.

As described above, the synchronous buck circuit might supply power to the input side due to a variation in the transmission voltages ±HV2. The transmission power supply portion 4 might supply power to the input side when the high-voltage fixed power supply portion 2 connects with the bias voltage output portion 3 and the transmission power supply portion 4. However, the regenerative electric power storage portion 5 charges the power supplied to the input side from the transmission power supply portion 4. No problem occurs. In addition, the power can be efficiently used and conserved.

Regenerating the power can quickly change the transmission voltages ±HV2 from ±v1 to ±v2.

Second Embodiment

The second embodiment will be described with reference to FIG. 9. Hereinafter, the mutually corresponding parts in the second and first embodiments are designated by the same reference numerals and a detailed description is omitted for simplicity.

A power circuit 1' according to the example includes an operation stop portion 10. The operation stop portion 10 detects a voltage in the regenerative electric power storage portion 5. When the detected voltage reaches a specified value or larger, the operation stop portion 10 outputs a signal to the positive-side synchronous buck circuit 41 and the negative-side synchronous buck circuit 42 to stop operations of the positive-side synchronous buck circuit 41 and the negative-side synchronous buck circuit 42. The operation stop portion 10 is an exemplary operation stop portion 10.

The operation stop portion 10 detects voltages in the positive-side regenerative electric power storage portion 51 and the negative-side regenerative electric power storage portion 52. In more detail, the operation stop portion 10 detects a voltage between the diode D1 and the capacitor C1 and a voltage between the diode D2 and the capacitor C2. As a result, voltages of the capacitors C1 and C2 are detected.

As described above, the power circuit 1' according to the example stops operations of the positive-side synchronous buck circuit 41 and the negative-side synchronous buck circuit 42 when the regenerative electric power storage portion 5 reaches a specified voltage or higher. The circuit can prevent voltage breakdown.

While exemplary embodiments of the present invention are described herein, it is to be distinctly understood that the present invention is not limited thereto but may be otherwise variously embodied within the spirit and scope of the invention. For example, the high-voltage fixed power supply portion 2 is not limited to an SEPIC circuit but may be a flyback converter.

The power circuits 1 and 1' may include multiple transmission power supply portions 4. Also in this case, the transmission power supply portions 4 are connected to the line c between the diode D1 and the capacitor C1 and the line d between the diode D2 and the capacitor C2.

The invention claimed is:
1. An ultrasonic image display apparatus power circuit comprising:

a high-voltage fixed power supply portion configured to boost a voltage of a low-voltage power supply and generate positive and negative voltages;

a bias voltage output portion connected to said high-voltage fixed power supply portion and configured to output a bias voltage to a switch configured to switch an ultrasonic transducer configured to transmit and receive an ultrasonic wave;

a transmission power supply portion connected to said high-voltage fixed power supply portion, said transmission power supply portion configured to supply transmission power for the ultrasonic wave to the ultrasonic transducer and configured to regenerate the transmission power as regeneration power to said high-voltage fixed power supply portion, said transmission power supply portion configured to supply power to both the ultrasonic transducer and said high-voltage fixed power supply portion, said transmission power supply portion comprising a synchronous buck circuit that comprises a positive-side synchronous buck circuit configured to generate positive transmission voltages and a negative-side synchronous buck circuit configured to generate negative transmission voltages; and a regenerative electric power storage portion provided between said high-voltage fixed power supply portion and said transmission power supply portion and configured to store regeneration power from said transmission power supply portion, said regenerative electric power storage portion comprising a positive-side regenerative electric power storage portion configured to store regeneration power from said positive-side synchronous buck circuit and a negative-side regenerative electric power storage portion configured to store regeneration power from said negative-side synchronous buck circuit.

2. The ultrasonic image display apparatus power circuit according to claim 1, wherein said bias voltage output portion comprises a low pass filter.

3. The ultrasonic image display apparatus power circuit according to claim 1, wherein the bias voltage output portion comprises a current limiting circuit.

4. The ultrasonic image display apparatus power circuit according to claim 1, wherein an output voltage from said high-voltage fixed power supply portion equals the bias voltage.

5. The ultrasonic image display apparatus power circuit according to claim 1,
wherein said regenerative electric power storage portion comprises a diode and a capacitor serially connected to each other; and
wherein the regeneration power is stored in said capacitor.

6. The ultrasonic image display apparatus power circuit according to claim 5,
wherein said diode and said capacitor are provided between said high-voltage fixed power supply portion and a ground;
wherein said diode is provided toward said high-voltage fixed power supply portion; and
wherein said capacitor is provided toward said ground.

7. The ultrasonic image display apparatus power circuit according to claim 6,
wherein said transmission power supply portion is connected between said diode and said capacitor.

8. The ultrasonic image display apparatus power circuit according to claim 7, wherein said diode is provided in a direction such that said diode is configured to prevent a current regenerated from said transmission power supply portion from flowing backward to said high-voltage fixed power supply portion.

9. The ultrasonic image display apparatus power circuit according to claim 1, further comprising:
an operation stop portion configured to detect a voltage of said regenerative electric power storage portion and configured to stop an operation of said transmission power supply portion when a detected voltage reaches at least one of a predetermined value and a larger value.

10. An ultrasonic image display apparatus comprising an ultrasonic image display apparatus power circuit comprising:
a high-voltage fixed power supply portion configured to boost a voltage of a low-voltage power supply and generate positive and negative voltages;
a bias voltage output portion connected to said high-voltage fixed power supply portion and configured to output a bias voltage to a switch configured to switch an ultrasonic transducer configured to transmit and receive an ultrasonic wave;
a transmission power supply portion connected to said high-voltage fixed power supply portion, said transmission power supply portion configured to supply transmission power for the ultrasonic wave to the ultrasonic transducer and configured to regenerate the transmission power as regeneration power to said high-voltage fixed power supply portion, said transmission power supply portion configured to supply power to both the ultrasonic transducer and said high-voltage fixed power supply portion, said transmission power supply portion comprising a synchronous buck circuit that comprises a positive-side synchronous buck circuit configured to generate positive transmission voltages and a negative-side synchronous buck circuit configured to generate negative transmission voltages; and
a regenerative electric power storage portion provided between said high-voltage fixed power supply portion and said transmission power supply portion and configured to store regeneration power from said transmission power supply portion, said regenerative electric power storage portion comprising a positive-side regenerative electric power storage portion configured to store regeneration power from said positive-side synchronous buck circuit and a negative-side regenerative electric power storage portion configured to store regeneration power from said negative-side synchronous buck circuit.

11. A method of assembling an ultrasonic image display apparatus power circuit, said method comprising:
providing a high-voltage fixed power supply portion configured to boost a voltage of a low-voltage power supply and generate positive and negative voltages;
coupling a bias voltage output portion to the high-voltage fixed power supply portion, the bias voltage output portion configured to output a bias voltage to a switch configured to switch an ultrasonic transducer configured to transmit and receive an ultrasonic wave;
coupling a transmission power supply portion to the high-voltage fixed power supply portion, the transmission power supply portion configured to supply transmission power for the ultrasonic wave to the ultrasonic transducer and configured to regenerate the transmission power as regeneration power to the high-voltage fixed power supply portion, the transmission power supply portion configured to supply power to both the ultrasonic transducer and the high-voltage fixed power supply portion, the transmission power supply portion including a synchronous buck circuit that includes a positive-side synchronous buck circuit configured to generate positive transmission voltages and a negative-side synchronous buck circuit configured to generate negative transmission voltages; and coupling a regenerative electric power storage portion between the high-voltage fixed power supply portion and the transmission power supply portion, the regenerating configured to store regeneration power from the transmission power supply portion, the regenerative electric power storage portion including a positive-side regenerative electric power storage portion configured to store regeneration power from the positive-side synchronous buck circuit and a negative-side regenerative electric power storage portion configured to store regeneration power from the negative-side synchronous buck circuit.

12. A method in accordance with claim 11, wherein coupling a bias voltage output portion comprises coupling a low pass filter to the high-voltage fixed power supply portion.

13. A method in accordance with claim 11, wherein coupling a bias voltage output portion comprises coupling a current limiting circuit to the high-voltage fixed power supply portion.

14. The ultrasonic image display apparatus according to claim 10, wherein said bias voltage output portion comprises a low pass filter.

15. The ultrasonic image display apparatus according to claim 10, wherein the bias voltage output portion comprises a current limiting circuit.

16. The ultrasonic image display apparatus according to claim 10, wherein an output voltage from said high-voltage fixed power supply portion equals the bias voltage.

17. The ultrasonic image display apparatus according to claim 10,
wherein said regenerative electric power storage portion comprises a diode and a capacitor serially connected to each other; and
wherein the regeneration power is stored in said capacitor.

18. The ultrasonic image display apparatus according to claim 17,
wherein said diode and said capacitor are provided between said high-voltage fixed power supply portion and a ground;
wherein said diode is provided toward said high-voltage fixed power supply portion; and
wherein said capacitor is provided toward said ground.

19. The ultrasonic image display apparatus according to claim 18,
wherein said transmission power supply portion is connected between said diode and said capacitor.

20. The ultrasonic image display apparatus according to claim 19, wherein said diode is provided in a direction such that said diode is configured to prevent a current regenerated from said transmission power supply portion from flowing backward to said high-voltage fixed power supply portion.

* * * * *